DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 28, 1970

873 O.G. 1033

T873,014

1-ARYLAMINO-4-ARYLSULFONAMIDO-ANTHRAQUINONE COMPOUNDS

Max A. Weaver and Clarence A. Coates, Jr., both of P.O. Box 511, Kingsport, Tenn. 37662

Filed Jan. 23, 1969, Ser. No. 793,606
Int. Cl. C09b *1/34, 1/54*
U.S. Cl. 260—373
No Drawing. 8 Pages Specification

A water-insoluble compound having the formula

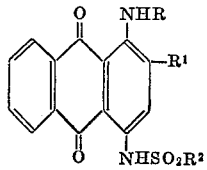

wherein:

R and $R^2$ are the same or different and each is phenyl or phenyl substituted with lower alkyl, lower alkoxy, lower hydroxyalkoxy, or halogen;

$R^1$ is hydrogen, lower alkyl, lower alkoxy, lower hydroxyalkoxy, lower alkoxy-lower-alkoxy, lower hydroxyalkoxy-lower-alkoxy; halogen; cyano; phenoxy, or phenoxy substituted with lower alkyl, lower alkoxy, lower hydroxyalkoxy, or halogen. The compounds are useful as dyes for hydrophobic textile materials such as cellulose acetate, polyamide, modacrylic and polyester fibers, yarns and fabrics.